United States Patent Office 3,541,200
Patented Nov. 17, 1970

3,541,200
SURFACE CRYSTALLIZATION OF POLY(2,2,4,4-TETRAMETHYLCYCLOBUTANEDIOL - 1,3) CARBONATES BY SOLVENT VAPOR
Walter D. Niegisch, Watchung, N.J., assignor to Union Carbide Corporation, a corporation of New York
No Drawing. Filed Dec. 26, 1967, Ser. No. 693,120
Int. Cl. B29c 25/00
U.S. Cl. 264—343         6 Claims

ABSTRACT OF THE DISCLOSURE

A shaped, transparent, non-oriented carbonate polymer containing the esterification residue of 2,2,4,4-tetramethyl-cyclobutanediol-1,3 wherein either the shaped article has a plurality of surfaces or a single surface, with the proviso that where the shaped article has a plurality of surfaces at least two surfaces thereof are crystalline and any portion of the article which is free of crystallinity is amorphous and that where the shaped article has a single surface the single surface is crystalline and any portion of the article which is free of crystallinity is amorphous, and which crystalline surfaces are resistant to attack by solvating organic liquids, such as conventional solvents for the amorphous polymer, and body oils, without adversely affecting its transparency. The method of crystallizing the polycarbonate involves contacting the surfaces of the amorphous polymer with an amount of vaporous organic solvent therefor or for a period of time sufficient to crystallize the surfaces without adversely affecting the transparency of the polymer and thereafter annealing the polymer by heating to a temperature below its glass transition temperature for a period of time sufficient to remove stresses.

---

This invention relates to the crystallization of amorphous carbonate polymers. More particularly, it is directed to the crystallization of amorphous aliphatic carbonate polymers, particularly those containing the esterification residue of 2,2,4,4-tetramethylcyclobutanediol-1,3 to enhance their resistance to solvating organic liquids such as conventional solvents for the polymer and fatty acids and the like usually found in body oils, without adversely affecting their transparency.

While the most widely known and used carbonate polymers have been the aryl carbonate polymers such as those based on "bisphenol A," 2,2-bis(4-hydroxyphenyl)propane, and other polyhydric phenols, recently discovered carbonate polymers containing the esterification residue of 2,2,4,4-tetramethylcyclobutanediol-1,3 (characterized as 2,2,4,4-tetramethylcyclobutylene), hereinafter designated TMCBD, have been found to possess properties superior to those of the aryl carbonate polymers and indeed, even to other aliphatic carbonate polymers which do not contain TMCBD. For example, the clarity and weathering resistance of these new polymers surpass the commercial aryl carbonates presently available. However, while the amorphous TMCBD containing polycarbonates possess many enhanced properties, they also exhibit a serious deficiency in that they become indelibly marked or marred after contact with solvating organic liquids, such as solvents and solvating body oils. Thus on handling shaped articles of manufacture made of these polymers with one's hands, the surface can be indelibly marred by creating blotches, which achieve an unattractive gross haziness on the surface. Moreover, the surfaces of such polymers are typically soluble in liquids which are commonly used, such as acetone, benzene, chlorobenzene, toluene, xylene, carbon tetrachloride, chloroform, trichloroethylene, perchloroethylene and tetrachloroethane and articles therefrom are susceptible to marring when contacted by such solvents. This lack of surface resistance of polymers containing TMCBD to solvation seriously impairs their commercial usefulness. The indelible marring of these polycarbonates by body oils appears to be exclusive and is not seen to be a problem with aryl polycarbonates.

There is described herein a polycarbonate containing TMCBD which is not marred or blotched by body oils, particularly human body oils, and conventional solvents which dissolve the amorphous polycarbonate. Moreover, the polycarbonate as described herein possesses enhanced surface clarity and transparency, determined when free of incompatible components such as pigments, dyes and/or fillers, than the corresponding amorphous polycarbonate.

This invention is concerned with a crystalline, non-oriented polycarbonate containing TMCBD as a unit thereof, most preferably a homopolymer of sequentially repeating units of

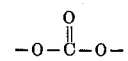

and TMCBD. More particularly, this invention is concerned with such a crystalline, non-oriented polycarbonate which possesses a surface thereof which is resistant to solvation by body oils and conventional solvents for the corresponding amorphous polycarbonate.

This invention encompasses the treatment of already formed amorphous polymers to induce crystallinity therein whereby to produce a shaped article of the crystalline polymer which possesses resistance to marring when contacted at a crystalline containing portion thereof with solvating liquids such as conventional solvents and body oils.

A specific embodiment of this invention is a shaped, transparent, non-oriented carbonate polymer containing the esterification residue of 2,2,4,4-tetramethylcyclobutanediol-1,3 wherein either the shaped article has a plurality of surfaces or a single surface, with the proviso that where the shaped article has a plurality of surfaces at least two surfaces thereof are crystalline and any portion of the article which is free of crystallinity is amorphous and that where the shaped article has a single surface the single surface is crystalline and any portion of the article which is free of crystallinity is amorphous, and which crystalline surfaces are resistant to attack by solvating organic liquids, such as conventional solvents for the amorphous polymer, and body oils, without adversely affecting its transparency.

In another specific embodiment of this invention, there is provided a method of crystallizing the polycarbonate which involves contacting the amorphous polymer with an amount of vaporous organic solvent therefor for a period of time sufficient to crystallize the surfaces without adversely affecting the transparency of the polymer and thereafter annealing the polymer by heating to a temperature below its glass transition temperature for a period of time sufficient to remove stresses.

The article can have any shape. However, where the article has a plurality of surfaces, for example a slot extruded sheet, at least two surfaces thereof are crystalline and any portion of the article which is free of crystallinity is amorphous. Likewise, where the article has only one distinct surface, for example, a sphere, this single surface is crystalline and any portion of the sphere which is free of crystallinity is amorphous.

It is not intended herein to imply that when any portion of the polymer is made crystalline that that portion is wholly crystalline to the exclusion of an amorphous phase. The term crystallinity or crystalline means herein and in the claims that that portion of the polymer which is so regarded to be crystalline contains both a crystalline and amorphous phase and the amount of crystallinity present is detectible and renders that portion of the polymer resistant to solvation by solvents which will normally solvate an amorphous portion of the same polymer free of such crystallinity. The presence of crystallinity can be determined by conventional methods such as X-ray defraction and solubility.

The polycarbonates of this invention include homopolymers and copolymers and consist of alternating carbonate groups

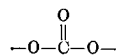

and the divalent moiety of 2,2,4,4-tetramethylcyclobutylene formed by theoretically splitting off both hydroxyl groups of 2,2,4,4-tetramethylcyclobutanediol-1,3 to yield the divalent radical

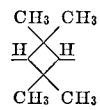

These polycarbonates can be advantageously prepared by the general method of alcoholysis and ester interchange as is more fully described in British Pat. 1,011,283 and/or U.S. Pat. 3,313,777.

The polycarbonate homopolymers are generally preferred since they have been found to be of greatest utility and particularly suitable to the process disclosed herein. The homopolymers are those which are of sufficiently high molecular weight to be normally solid, i.e., solid at normal room temperatures, but are also of sufficiently low molecular weight to be tractable and thermoformable. In general, in the homopolymer represented by the structure:

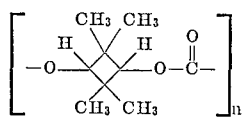

the number $n$ has a value such that the reduced viscosity (determined with 0.2 gram polymer dissolved in 100 ml. of chloroform at 25° C.) of the polymer is from about 0.25 to about 10.0 but preferably from about 0.4 to 2.7, with reduced viscosities in the range of about 0.50 to about 1.50 being particularly preferred.

The modified polymers which are designated hereinafter as TMCBD polycarbonate copolymers are characterized by containing as recurring units within the polymer chain, esterification residue moieties of one or more diols other than and in addition to 2,2,4,4-tetramethylcyclobutylene moieties. The modifying diols can be either dihydric phenols, bisphenols, aliphatic diols, or mixed diols in which one of the two active hydroxyl groups is directly attached to an aromatic ring and the other reactive hydroxyl group is attached to an aliphatic carbon atom.

The diphenol reactants suitably employed include any of the diphenols heretofore employed in the formation of prior known polycarbonate resins. Conveniently they can be classified as conforming to the general formula:

(I)  HO—Ar—$R_n$—Ar—OH in which Ar in each occurrence represents a divalent aromatic radical, preferably phenylene, but also can be polynuclear, such as bisphenylene, a fused ring structure having an aromatic character such as napthylene, anthrylene and the like or mixed polynuclear aromatic radicals. The divalent radical (Ar—$R_n$—Ar) is hereinafter identified as a divalent aromatic carbocyclic group derived from a dihydric phenol. R in each occurrence can be an alkylene or alkylidene radical such as methylene, ethylene, propylene, propylidene, isopropylidene, butylene, butylidene, isobutylidene, amylene, isoamylene, amylidene, isoamylidene, and the like; a cycloaliphatic radical such as cyclopentylidene, cyclohexylidene, cyclopentylene and cyclohexylene; a divalent radical formed from two or more alkylene or alkylidene groups connected by a non-alkylene or non-alkylidene group such as an aromatic linkage, a cycloaliphatic linkage, a tertiary amino linkage, an ether linkage, a thioether linkage, a carbonyl linkage, a sulfur-containing linkage such as sulfoxide or sulfone; an ether linkage, a carbonyl group, or a silicon-containing group; $n$ can be either zero or one.

Both Ar and R in the above general formula can contain substituent groups inert toward the reactants under the conditions of the reaction system. Such substituents include monovalent hydrocarbon groups such as methyl, ethyl, propyl, phenyl, naphthyl, benzyl, ethylphenyl, cyclopentyl, cyclohexyl, and the oxy derivatives thereof; inorganic radicals such as chlorine, bromine, fluorine, and the like.

The aliphatic diols include cycloaliphatic, straight and branched chain diols free of substituent groups reactive toward the other reactants of the reaction system. In general, these diols conform to the formula:

(II)  HO—Y—OH in which Y can be an alkylene group such as ethylene, propylene, butylene, amylene, isoamylene, neopentylene and the like; two or more alkylene or alkylidene groups connected by a non-alkylene or non-alkylidene group such as an ether linkage, an arylene linkage, a carbonyl linkage, a sulfur containing linkage such as sulfide, sulfoxide or sulfone, a cycloaliphatic group such as cyclopentylene, cyclohexylene, or a silicon-containing linkage such as dimethyl silyl or dimethylsiloxy. Substituent groups on the Y group can be halogen, nitro, cyano or aryl, but reactive groups such as hydroxyl (other than the two such groups necessarily present), amine, and carboxyl are to be avoided unless one wishes to effect cross-linking of the polymer.

Specifically illustrative of the cycloaliphatic diols that can be employed in this invention, but in no way limitative thereof, are 2,5- or 2,6-norbornane diol, 2,5- or 2,6-norbornane dimethanol, mixed cyclohexane-1,4-diols, cyclohexane-1,4-dimethanols and the like.

The preparation of the polycarbonate copolymers is accomplished by the method described hereinbefore for preparing polycarbonate homopolymers from 2,2,4,4-tetramethylcyclobutanediol-1,3. Reaction conditions with respect to temperature, pressure, catalysts, chain growth terminators, solvents, carbonate precursors, concentration of reactants and the like, apply with equal force to the preparation of the copolymers. Preferably either one or a mixture of dihydroxy compounds other than 2,2,4,4-tetramethylcyclobutanediol-1,3 can be suitably employed provided that the 2,2,4,4-tetramethylcyclobutanediol-1,3 is present in a mole percent of at least about 60 and preferably not less than 80 based on the total moles of dihydroxy compounds in the formulation of reactants.

The most preferred copolymers are in general represented by the structure:

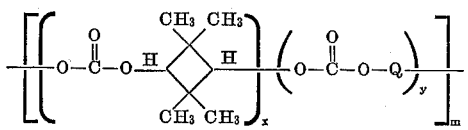

wherein Q in each occurrence represents an

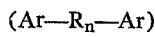

group or a (Y) group of Formulae I and II above, respectively, $m$ has a value such that the reduced viscosity of the copolymer (determined with 0.2 gram polymer dissolved in 100 ml. chloroform at 25° C.) is from about 0.25 to about 10.0 preferably from about 0.4 to 2.7, and the relationship of $x$ and $y$ is the expression $x/(x+y)$ which has a value of at least about 0.6 and preferably at least about 0.8. It is particularly preferred that the polymer have a reduced viscosity value of from about 0.50 to 1.50.

As produced these polycarbonate polymers prepared from 2,2,4,4-tetraethylcyclobutanediol-1,3 are amorphous polymers, which as stated earlier, are readily attacked by body oils while the crystallized polymers are not. Though crystallinity can achieve such an advantage, improper processing which can create non-orientation induced crystallinity can result in loss of transparency or clarity of the polymer. For example, when the amorphous polymer is exposed to 100 percent liquid acetone at temperatures of from about 15° C. to about 40° C., crystallization of the surface of the polymer occurs but in addition thereto, the polymer whitens. This whitening is undesirable. But since crystallinity and clarity of the polymer in the present invention are a function of vaporous organic solvent temperature as well as vaporous organic solvent concentration and exposure time, this whitening can be alleviated and even eliminated by reducing the solvating power of the organic solvent as for example by cooling the solvent. Obviously, working at low or cooling temperatures are inconvenient and impractical for commercial application since such temperatures are not easily obtainable. On the other hand, solvent temperatures of from about 15° C. to about 40° C. are readily and conveniently obtainable and hence most particularly preferred. Hence, it was found, in accordance with the present invention, that vaporous organic solvent somewhat diluted by air or any inert gas such as nitrogen or argon, and maintained at temperatures of from about 15° C. to about 40° C. is a unique method for crystallizing the surfaces of TMCBD carbonate polymers without impairing the clarity of the polymer. In fact, the clarity is typically enhanced by such treatment.

In addition to acetone, a number of additional organic solvents vapors are suitable for crystallizing the surfaces of the amorphous polymer in accordance with the present invention. Examples of such solvent vapors, although not limited thereto, are butyl acetate, p-xylene, methanol, ethanol, methyl ethyl ketone, cyclohexane, cyclohexanone, trichloroethylene, ethyl acetate, hexane, diethyl ketone, dichloromethane, and carbon tetrachloride.

In the technique of crystallizing the surface(s) of amorphous TMCBD carbonate polymers by contacting with the above organic solvent vapors, a solvent concentration range is selected to produce a balance of minimum adverse optical effects and maximum protection from indelible marking or marring by solvating organic liquids and body oils. The vapor concentration employed is dependent on the nature of the solvent selected, the temperature employed at the time of contact, the time of contact desired, and the molding characteristics of the polymer sample employed.

To illustrated these factors, specific reference is made to the use of acetone, but it should be recognized that the other solvents can be similarly employed. For example, there has been found that contacting TMCBD carbonate polymers with acetone vapors in the practice of the present invention, an atmosphere at from about 70 percent to about 92 percent saturated with acetone vapors produces the crystalline effects desired, although it is preferred to use an atmosphere which is from about 78 percent to about 90 percent saturated with acetone vapors. Concentrations of about 96 percent or more may cause the polymer to crack in the area which is contacted with body oils, while concentrations below about 70 percent are impractical since lengthy exposure times are required to obtain sufficient crystallization. Also this lower limit has a tendency to vary depending on whether the polymer sample has been compression molded, injection molded or slot extruded. Also, if the atmosphere is ever saturated with acetone condensation of pure liquid acetone forms on the surface of the polymer sample being treated which impairs the clarity of the polymer.

Upon selecting a suitable acetone vapor concentration, the polymer is exposed to the acetone vapors for a time sufficient to crystallize the surface without adversely affecting the transparency of the polymer. Generally, the more soluble the polymer is in the particular solvent selected, the faster is the crystallization rate. Hence, it follows that the slower the crystallization rate, the longer must the contact time be since the solvating power of that solvent is low. Generally it has been found that exposure times of from about 20 seconds to about 60 seconds produce the desired effect. While exposure times longer than 60 seconds can be used especially with lower concentrations, such treatment times are generally impractical since they are lengthy. Similarly, while exposure times less than 20 seconds normally are insufficient to achieve satisfactory crystallization for acetone vapor concentrations lower than about 78 percent, such exposure times are most satisfactory for vapor concentrations of about 92 percent.

It is generally preferred to expose the polymer to the solvent vapors at room temperature about 15° C. to about 40° C. since room temperature is so easily obtainable. However, it is well known that the logarithm of the diffusion rate of a gas is linear with respect to the reciprocal of the absolute temperature. Therefore, contact times above room temperature would be reduced, whereas longer contact times would be required below room temperature for effective solvent vapor treatment times.

When the TMCBD carbonate polymer is tested after treatment with the organic solvent vapors, the polymer is "print resistant." However, the polymer has a tendency to craze or crack under prolonged exposure to body oils. Annealing the specimen after the treatment with solvent vapors for a period of time sufficient to remove stresses overcomes this tendency of the polymer. Annealing is a heat treatment of the polymer and can be readily effected by several methods. For example, instantaneous exposure of the polymer to a flame will effectively anneal the polymer. Similarly, heating in an oven where the polymer therein is at a temperature below the glass transition temperature of the polymer, e.g., below about 130° C. for periods of from about one to about five minutes in the case of the homopolymer, is usually sufficient to effectively anneal the polymer. For practical purposes, it is preferred to anneal the polymer by heating it to a temperature in the range of from about 95° C. to about 130° C. since below that range considerable time is required to effectively anneal the polymer, while above that range the polymer has a tendency to distort or warp. This is not an absolute range because it can vary somewhat in the case of some copolymers; however, it is a generally applicable range for all the polymers described herein. A preferred method of annealing the polymer is accomplished by submerging it in boiling water for a period of from about one to about three minutes. This last method provides an effective method of annealing the polymer continuously and is preferred for both its effectiveness and simplicity. Other annealing media than water can be used provided they are inert to the polymer, for example, ethylene glycol. The minimum annealing time for this last medium has been found generally to be about 30 seconds at about 130° C.

It should be noted that annealing conditions are dependent on several factors, namely, the longer the solvent vapor exposure time, or the more concentrated the mixture, the longer the annealing period, since the crystallized skin is thicker, thus producing a greater strain level to be alleviated. Also, a liquid medium is more efficient than air, which in turn is better than the solid (for example, planishing plates or rolls). Furthermore, annealing times vary inversely with temperature.

While surface crystallization of the amorphous TMCBD carbonate polymers increases their resistance to subsequent attack by natural body oils and the aforementioned organic solvents, it similarly increases the resistance of the surface to the effects of other attacking materials such as lemon oil, kerosene, mineral spirits, gasoline and alcohols, while at the same time decreases haze level and improves gloss.

The process of this invention is applicable to carbonate polymers in any form, e.g., sheet, film, rod, filament and various molded forms and shapes. Crystallization and annealing of TMCBD polycarbonate sheet under the preferred conditions set forth above provide a transparent non-oriented, amorphous polycarbonate having a clear crystalline skin. This polymer can be so improved by the process of this invention that it can be made to neither crack nor indelibly print after contact with body oils for ten days.

In addition to the enhanced properties set forth above, it should be noted that neither the crystalline surface nor the amorphous core of the polymer is oriented. Accordingly, shrinkage or distortion on heating does not occur.

Quite surprisingly this process is not applicable to the carbonate polymers based principally on dihydric phenols as usually no effect is obtained. In fact, the present invention applied to certain of the aryl carbonate polymers has actually had an adverse effect on the properties of the polymer.

The examples which follow serve to illustrate this invention.

EXAMPLE I

Eight samples of 100 mil slot extruded sheets of poly-(2,2,4,4 - tetramethylcyclobutanediol - 1,3)carbonate having a reduced viscosity of 0.98 measured in chloroform at 25° C. at a concentration of 0.2 gram per 100 milliliters of chloroform were employed.

These samples were treated as follows: A calculated amount of acetone was injected into a 2 liter three neck flask which contained a dry argon atmosphere and stirred for about ½ hour past the time the liquid acetone had evaporated. The stirrer was removed, and a sample was quickly introduced into the system by means of a copper wire which extended outside the flask. The wire was directed through a hole in a heavy gauge aluminum foil which served as a temporary seal during the time the sample is in the vessel. The sample was then removed and the flask was stoppered. The concentration of the vaporous acetone in the flask was measured and the exposure time was noted. These samples were treated by contacting each with acetone vapors at room temperature (about 25° C.) and at concentrations and for various times as indicated in Table I below and thereafter annealed at 100° C. for a period of three minutes. Each of the samples tested were evaluated for appearance, liquid acetone resistance and marking or marring resistance to body oils.

The ability of these samples to resist indelible marking or marring by body oils is measured in the following manner: Samples of sebaceous oils secreted by humans (especially from the facial area) are transferred to a suitable probe and pressed by hand into the surface of the polymer and oil is deposited from the probe into the impression and is allowed to remain thereat overnight (generally about 17 hours) at room temperature (about 25° C.). Removal of the mar and/or oil is then attempted using an absorbent, non-abrasive type of rubbing pad such as cheese cloth, and hand pressure.

Upon crystallizing the surfaces of the polymer as indicated, its resistance to liquid acetone is determined by dipping the polymer in liquid acetone at room temperature (25° C.) or more and thereafter removing the polymer from the acetone and noting its appearance.

The particular concentrations contact times and results are set forth in Table I below.

TABLE I

| Sample | Percent saturated acetone vapor [a] | Vapor contact time, sec. | Fingerprint resistance [b] | Liquid acetone resistance [b] |
|---|---|---|---|---|
| 1 | 92.0 | 20 | 1 | 1 |
| 2 | 83.0 | 60 | 1 | 1 |
| 3 | 82.0 | 20 | 1 | 1 |
| 4 | 82.0 | 60 | 1 | 1 |
| 5 | 81.5 | 20 | 1 | 1 |
| 6 | 79.5 | 20 | 1 | 1 |
| 7 | 78.0 | 20 | 1 | 1 |
| 8 | 78.0 | 60 | 1 | 1 |

[a] Rounded to nearest 0.5%.
[b] 1=Complete resistance. No visual deterioration.

It is evident from Table I that resistance to liquid acetone is approximately comparable with fingerprint resistance. In fact, the resistance of the samples to a number of solvents is enhanced by crystallization by 90% saturated acetone vapors for 20 seconds, followed by a 3 minute annealing period in boiling water. Subsequent immersion for 5 seconds in solvents which otherwise impair the optical properties of the polymer affords complete solvent resistance for a number of solvents as shown in Table II.

TABLE II.—SOLVENT RESISTANCE OF SURFACE CRYSTALLIZED TMCBD CARBONATE POLYMER

| Solvent | Appearance of— | |
|---|---|---|
| | Control | Treated sample |
| Acetone | 1 | 2 |
| Petroleum ether | 1 | 2 |
| Ethyl acetate | 1 | 2 |
| Pentane | 1 | 2 |
| Hexane | 1 | 2 |
| Heptane | 1 | 2 |
| Diethyl ether | 1 | 2 |
| Nitrobenzene | 1 | 2 |

Note.—1=Surface whitened; 2=Complete resistance, fully transparent, no surface deterioration.

EXAMPLE II

Thirty-seven samples of 100 mil slot extruded sheets of poly(2,2,4,4 - tetramethylcyclobutanediol - 1,3- carbonate having a reduced viscosity of 0.98 measured in chloroform at 25° C. at a concentration of 0.2 gram per 100 milliliters of chloroform were prepared. These samples were treated in the same manner as Example I by contacting each with various organic solvent vapors at room temperature and at concentrations and for various times and thereafter annealed at 100° C. for a period of three minutes. Each of the samples tested were evaluated for appearance, liquid acetone resistance and marking or marring resistance to body oils as described in Example I. The particular concentrations, contact time and results are set forth in Table III below.

heating to a temperature below its glass transition temperature for a period of time sufficient to remove stresses.

2. The method of claim 1 wherein the vaporous organic solvent is acetone.

TABLE III

| Sample | Vapor | Percent saturated | Annealed | Vapor contact time, sec. | Appearance after vapor contact | Liquid acetone resistance, 5 sec. contact | Appearance after removing print |
|---|---|---|---|---|---|---|---|
| 1 | Butyl acetate | 100 | Yes | 20 | 4 | 4 | 7 |
| 2 | do | 100 | Yes | 10 | 4 | 4 | 9 |
| 3 | do | 100 | Yes | 5 | 4 | 4 | 9 |
| 4 | do | 100 | No | 20 | 4 | 4 | 7 |
| 5 | p-Xylene | 90 | Yes | 60 | 4 | 4 | 7 |
| 6 | do | 90 | Yes | 20 | 4 | 4 | 7 |
| 7 | do | 90 | Yes | 10 | 4 | 4 | 7 |
| 8 | do | 90 | Yes | 5 | 4 | 2 | |
| 9 | Methanol | 90 | Yes | 20 | 4 | 1 | |
| 10 | do | 100 | Yes | 3,600 | 4 | 4 | 7 |
| 11 | Ethanol | 100 | Yes | 900 | 4 | 4 | 7 |
| 12 | do | 100 | Yes | 300 | 4 | 2 | |
| 13 | do | 100 | Yes | 120 | 4 | 2 | |
| 14 | Methyl ethyl ketone | 100 | Yes | 20 | 4 | 4 | 9 |
| 15 | Cyclohexane | 100 | Yes | 45 | 4 | 4 | 9 |
| 16 | Cyclohexanone | 100 | Yes | 180 | 4 | 4 | 9 |
| 17 | Ethyl acetate | 100 | Yes | 20 | 4 | 4 | 7 |
| 18 | Hexane | 100 | Yes | 20 | 4 | 4 | 9 |
| 19 | Diethyl ketone | 100 | Yes | 20 | 4 | 4 | 7 |
| 20 | Dichloromethane | 100 | Yes | 20 | 4 | 4 | 9 |
| 21 | Carbon tetrachloride | 67 | Yes | 600 | 4 | 4 | 9 |
| 22 | Chloroform | 70 | Yes | 120 | 4 | 4 | 9 |
| 23 | Trichloroethylene | 100 | Yes | 20 | 4 | 4 | 9 |
| 24 | do | 100 | Yes | 10 | 4 | 4 | 9 |
| 25 | do | 100 | Yes | 5 | 4 | 4 | 9 |
| 26 | do | 90 | Yes | 20 | 4 | 4 | 9 |
| 27 | do | 90 | Yes | 10 | 4 | 4 | 9 |
| 28 | do | 90 | | 5 | 4 | 2 | |
| 29 | do | 80 | Yes | 20 | 4 | 4 | 9 |
| 30 | do | 80 | Yes | 10 | 4 | 4 | 9 |
| 31 | do | 80 | | 5 | 4 | 4 | |
| 32 | do | 70 | Yes | 20 | 4 | 4 | 9 |
| 33 | do | 70 | | 10 | 4 | 2 | |
| 34 | do | 60 | Yes | 20 | 4 | 4 | 9 |
| 35 | do | 50 | Yes | 20 | 4 | 4 | 9 |
| 36 | do | 40 | | 20 | 4 | 2 | |
| 37 | do | 40 | | 60 | 4 | 3 | |

NOTE.—1. Surface whitened or dissolving; 2. Surface not whitened but sample hazy; 3. Sample slightly hazy; 4. Sample visually clear; 5. Visually transparent but surface slightly roughened; 6. Definite print indelibly etched in surface; 7. Surface print resistant but slightly crazed; 8. Faint haze in printed region; 9. Complete print resistance.

As illustrated in Table III, various organic solvent vapors are effective for crystallizing the surface of the carbonate polymer of the present invention, thereby rendering the crystallized portion resistant to solvent and body oil attack. The vapors of some solvents have a higher solvating power than others and consequently vapor contact time need not be as long as those of lower solvating power. Hence, because of the solvating power of the particular solvent vapor selected, longer solvent vapor contact times may be necessary in order to provide adequate crystallization. Trichloroethylene vapors are particularly desirable for crystallizing the polymer and rendering it resistant to solvent and body oil attack since this solvent is nonflammable and thus is more practical for commercial application.

It is not intended herein to imply that when any portion of the polymer is amorphous that it is totally free of crystallinity. It is possible that some crystallinity is present in the amorphous phase but it is undetectible by conventional crystallinity detection methods and/or not significant enough to render that portion resistant to subsequent attack by organic solvents and body oils.

What is claimed is:

1. A method of crystallizing a shaped non-oriented carbonate polymer containing the esterification residue of 2,2,4,4-tetramethylcyclobutanediol - 1,3 comprising contacting the amorphous polymer with an amount of vaporous organic solvent therefor for a period of time sufficient to crystallize the surfaces in contact with the solvent vapors without adversely affecting the transparency of the polymer and thereafter annealing the polymer by heating to a temperature below its glass transition temperature for a period of time sufficient to remove stresses.

3. The method of claim 1 wherein the vaporous organic solvent is butyl acetate.

4. The method of claim 1 wherein the polymer is annealed by heating the treated polymer in boiling water for a period of from about 1 to about 3 minutes.

5. The method of claim 1 wherein the vaporous organic solvent is trichloroethylene.

6. The method of claim 5 wherein the polymer is annealed by heating the treated polymer in boiling water for a period of from about 1 to about 3 minutes.

References Cited

UNITED STATES PATENTS

| 2,336,384 | 12/1943 | Baker et al. | 264—346 X |
| 3,155,756 | 11/1964 | Hechelhammer et al. | 264—178 |
| 3,244,789 | 4/1966 | Hofmeir | 264—343 X |
| 3,313,777 | 4/1967 | Elam et al. | |
| 3,327,033 | 6/1967 | Koch et al. | 264—341 X |
| 3,375,210 | 3/1968 | D'Onofrio. | |
| 3,446,886 | 5/1969 | Karickhoff | 264—234 |

FOREIGN PATENTS 693,056  8/1964  Canada.

DONALD J. ARNOLD, Primary Examiner

J. H. WOO, Assistant Examiner

U.S. Cl. X.R.

81—130.1; 264—230, 235, 346